United States Patent [19]

Fridman

[11] Patent Number: 4,519,988
[45] Date of Patent: May 28, 1985

[54] TWO STAGE CHLORINATION OF TITANIFEROUS ORE

[75] Inventor: Semyon D. Fridman, Randallstown, Md.

[73] Assignee: SCM Corporation, New York, N.Y.

[21] Appl. No.: 638,854

[22] Filed: Aug. 8, 1984

[51] Int. Cl.³ ............................................. C01G 23/02
[52] U.S. Cl. ...................................... 423/76; 423/74; 423/75; 423/78; 423/79; 75/1 T
[58] Field of Search .................................. 423/74–76, 423/78, 79; 75/1 T

[56] References Cited

U.S. PATENT DOCUMENTS

| | | |
|---|---|---|
| 2,589,466 | 3/1952 | Wilcox . |
| 2,642,339 | 6/1953 | Sawyer . |
| 2,657,976 | 11/1953 | Rowe et al. . |
| 3,067,005 | 12/1962 | Nelson et al. . |
| 3,105,736 | 10/1963 | Groves . |
| 3,144,303 | 8/1964 | Engelmann . |
| 3,376,112 | 4/1968 | Dunn, Jr. et al. . |
| 3,466,169 | 9/1969 | Nowak et al. . |
| 3,495,936 | 2/1970 | Jones, Jr. . |
| 3,683,590 | 8/1972 | Dunn, Jr. . |
| 3,787,556 | 1/1974 | Piccolo et al. . |
| 3,859,077 | 1/1975 | Othmer . |
| 3,925,057 | 12/1975 | Fukushima et al. . |
| 3,977,862 | 8/1976 | Glaesar . |
| 3,977,863 | 8/1976 | Glaesar . |
| 3,977,864 | 8/1976 | Glaesar . |
| 3,989,510 | 11/1976 | Othmer . |
| 4,014,976 | 3/1977 | Adachi et al. . |
| 4,017,304 | 4/1977 | Glaesar . |
| 4,046,853 | 9/1977 | Robinson . |
| 4,055,621 | 10/1977 | Okudaira et al. . |
| 4,140,746 | 2/1979 | Turner et al. . |
| 4,174,381 | 11/1979 | Reeves et al. . |
| 4,183,899 | 1/1980 | Bonsack . |
| 4,310,495 | 1/1982 | Bonsack . |
| 4,343,775 | 8/1982 | Bonsack . |
| 4,442,076 | 4/1984 | Bonsack . |

Primary Examiner—H. T. Carter
Attorney, Agent, or Firm—R. A. Sturges; T. M. Schmitz

[57] ABSTRACT

There is provided an improved process for chlorinating an iron-containing titaniferous ore, such as ilmenite which comprises dividing the ore charge into 2 parts. The first and major part is chlorinated with chlorine or with a mixture of chlorine and $FeCl_3$ under fluidized bed conditions to yield principally $TiCl_4$ and $FeCl_2$. The $FeCl_2$ is separated out and utilized as a chlorinating agent for the minor part of the ore in an entrained flow chlorinator to yield more $TiCl_4$ and metallic iron as principal products. This process avoids the need for disposal of $FeCl_2$ and retains the advantages of conventional chlorination procedures.

4 Claims, 1 Drawing Figure

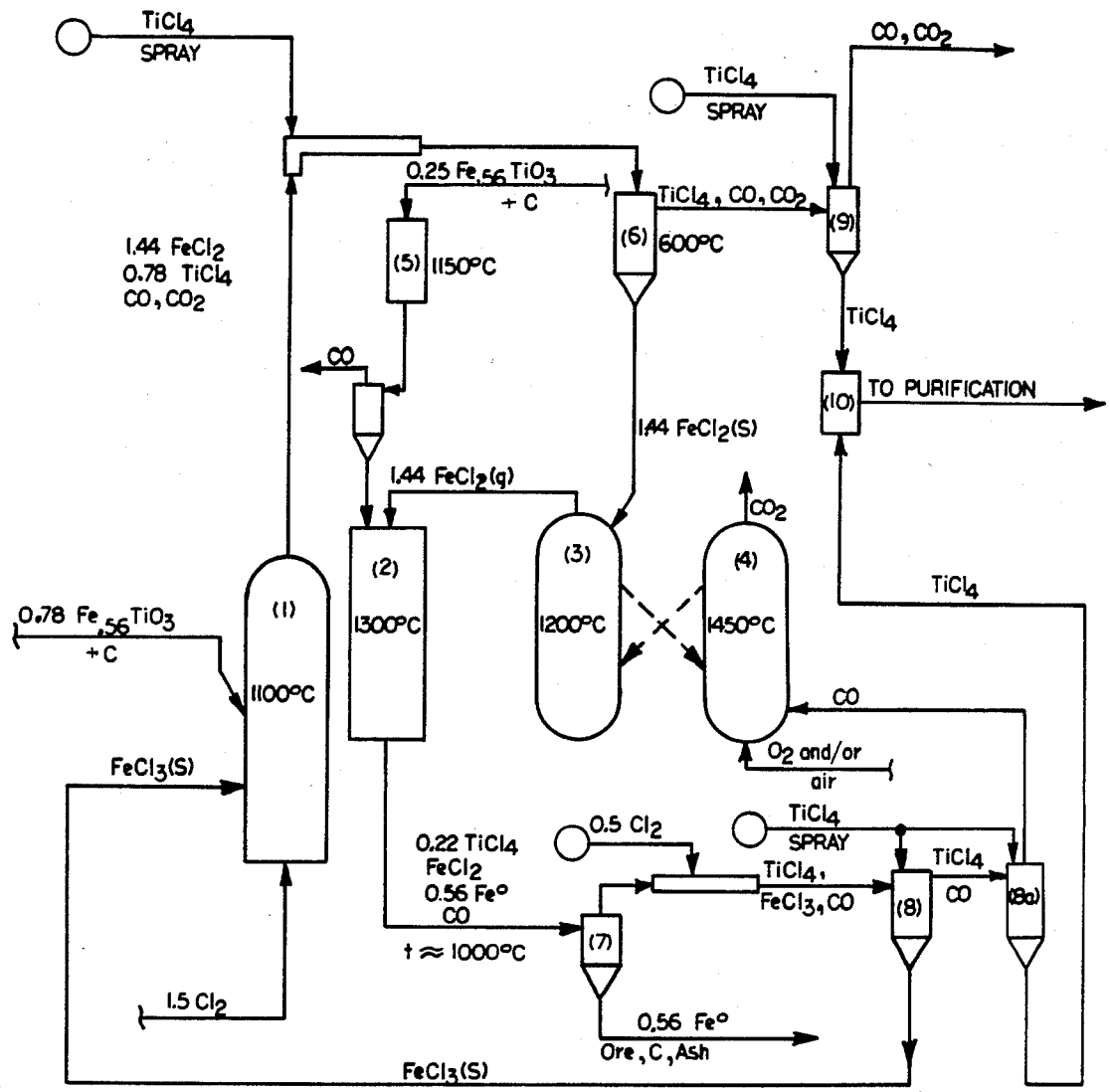

TWO STAGE CHLORINATION OF TITANIFEROUS ORE

This invention relates to the production of titanium tetrachloride (TiCl$_4$) from an iron-containing titaniferous ore, e.g., ilmenite, rutile, titanium slags. It is characterized by dividing the process ore charge into two portions which are treated differently. It provides for nonselective chlorination of the first portion of the ore charge with chlorine, FeCl$_3$ or a mixture thereof, in a conventional fluid bed reactor yielding TiCl$_4$ and by-product FeCl$_2$ and chlorination of the remaining portion of the charge with by-product iron chloride from the first stage in a dilute phase reactor.

In this process, all chlorine values are utilized to yield TiCl$_4$.

The process is particularly advantageous in that the need for disposal of FeCl$_2$ is virtually eliminated and a by-product metallic iron poses little disposal problem.

BACKGROUND OF THE INVENTION AND PRIOR ART

Conversion of the titanium values in various titaniferous ores has been accomplished heretofore mainly by single stage chlorination of an ore/carbon mixture under fluidized bed conditions. Usually, the chlorination agent has been elemental chlorine. By-product iron chlorides, especially where the titaniferous ore contains a significant amount of iron, pose a problem in disposal and waste valuable chlorine.

In the present process, advantages are obtained by chlorinating in a two-stage process. In the first stage, a major part of the ore to be processed is chlorinated in a conventional fluidized bed reactor yielding TiCl$_4$ and iron chloride, mainly FeCl$_2$. A second smaller portion of the ore is ground ($-325$ mesh) and chlorinated in a dilute phase reactor with FeCl$_2$ vapor.

The present process provides an improved process for producing TiCl$_4$, a product useful in and of itself as a catalyst, or as a precursor to the production of high purity pigment grade titanium dioxide. Problems attendant preparation of the charge and disposal of by-products such as FeCl$_x$ are avoided.

Prior art is mainly concerned with a single stage chlorination process and does not provide a key to a two stage chlorination.

U.S. Pat. No. 2,589,466 to Wilcox discloses a process for removing titanium as titanium tetrachloride from ilmenite ore by heating the ore to a temperature above 1250° C. but below 1500° C., similarly heating chlorine to such a temperature and then bringing the chlorine and ore together in a reaction chamber. The iron contaminant in the ilmenite ore is removed as a solid residue while the TiCl$_4$ is vaporized out of the reactor.

U.S. Pat. No. 2,657,976 to Rowe et al. show a process for producing iron oxide and titanium tetrachloride from titaniferous iron ores. According to this process, the titanium ore containing iron is subdivided, mixed with carbon and placed in a chamber. Chlorine and moist air are introduced into the chamber to produce at an elevated temperature volatile ferric chloride substantially free from titanium tetrachloride. The amount of chlorine added is the theoretical amount required to react with the iron values but not with the titanium values. Moist air is also added. Ferric chloride is volatilized and separated from the titanium concentrate, and the ferric chloride reacted immediately with oxygen to produce ferric oxide and chlorine gas. The ferric oxide and chlorine so produced are separated and the chlorine returned to react with the titanium values in the concentrate to produce titanium tetrachloride. These reactions take place in a divided reactor.

U.S. Pat. No. 3,067,005 to Nelson et al., discloses a process for chlorinating a ferrotitanate such as ilmenite in a fluid bed reactor. Unreacted chlorine in the gaseous stream rising from the reaction zone is fixed (i.e., converted to a normally solid form) by adding FeCl$_2$ in particulate form to the stream while the stream is still at a temperature where FeCl$_2$ reacts with Cl$_2$ at a convenient speed, i.e., at a temperature in excess of 700° C. The resulting FeCl$_3$ at once sublimes and joins the off-gas stream from, which it can be readily separated. This process is adaptable for use in the present primary chlorination stage.

U.S. Pat. No. 3,105,736 to Groves discloses a process for the chlorination of metal bearing materials in a bed in a zone of chlorination which is improved by establishing a pair of fluidized beds of pulverulent material to be chlorinated suspended in an upwardly flowing stream of gas which is inert to the material. The beds having separate upper levels and being in communication below the upper levels. The upper level of the first bed forms a surface bounded on the one side by the fluid bed and on the other side by an inert fluidizing gas. The upper level of the second bed communicates directly with the zone of chlorination. As more material is fed into the first bed, material flows into the second of the bed and from there into the zone of chlorination by flow of the upper level.

U.S. Pat. No. 3,144,303 to Engelmann discloses a continuous process for the production of volatile metal halides, especially titanium tetrachloride and ferric chloride within a closed reaction vessel at an elevated temperature and in the presence of a gaseous or finely divided solid reducing agent, chlorine and a fluidized bed suspension of a finely divided titaniferous material such as ilmenite or rutile. The temperature and composition of the bed is maintained within optimum operating conditions by means of a dynamic interchange between a portion of the particles of the reactant bed with the particles from a communicating separate auxiliary fluidized bed maintained under control or regulated nonreacting conditions.

U.S. Pat. No. 3,376,112 to Dunn et al. relates to a process for flowing a molten metal salt complex of the formula XFeCl$_4$ where X is an alkali metal as a thin film over a moving bed of particulate inert material concurrently with an oxygen containing gas and recovering chlorine as a product.

U.S. Pat. No. 3,466,169 to Nowak et al. provides a process for chlorinating an ore in the presence of coke. The amount of chlorine is limited to the stoichiometric amount needed to form the chloride of the metal of greatest chloride forming affinity. The temperature is held above the vaporization point of the resulting chloride. This removes all of the metal of greatest chloride forming affinity from the ore. The resulting chloride gas along with any chloride impurities formed is passed over new ore which is free of carbon at which time chloride impurities are removed in favor of additional chloride of the metal of greatest chloride forming affinity in order to yield pure chloride of the metal of greatest chloride forming affinity. This pure metal chloride may then be reduced to yield metal in the zero valence state and the ore that is then free of all metals of greatest chloride forming affinity can be treated similarly for collection of the chloride of the metal of next greatest chloride forming affinity. TiCl$_4$ is contemplated according to this process.

U.S. Pat. No. 3,495,936 to Jones discloses a dilute phase chlorination process for titaniferous ores. Here the ores reacted with chlorine and a carbonaceous reducing agent in a dilute phase reactor system to yield metal chloride products, chiefly titanium tetrachloride.

U.S. Pat. No. 3,683,590 to Dunn teaches a process for condensing iron chlorides from a gaseous stream in two steps, the first step being the cooling of the gases to about 675° C. to condense ferrous chloride as a liquid and leaving a gas ferrous residual and then a second step of adding chlorine gas and sodium chloride salt separately wherein the remaining FeCl$_2$ is oxidized to FeCl$_3$ which with the initial FeCl$_3$ is converted to NaFeCl$_4$ and cooling that product to a temperature above 159° C. This process is useful for recovering iron chlorides from gaseous effluent to minimize air pollution.

According to U.S. Pat. No. 3,787,556 to Piccolo et al., titanium tetrachloride is made by feeding powdered ilmenite or titanium slag to a reactor with a reagent and heating gas streams of chlorine and the combustion products of coal. The reagent is carbon.

U.S. Pat. No. 3,859,077 to Othmer teaches the production of pure titanium dioxide under reducing conditions by a halogen-oxygen interchange between a titanium tetrahalide and an oxide of iron contained in a slag or in an ore, such as ilmenite, at a temperature of 1000° C. The iron and various impurities are volatilized as halides. Solid TiO$_2$ remains with some impurities which may be washed out with water or an aqueous acid or alkali. The gaseous ferrous halide is then reacted with some or all of the titanium dioxide and a reductant at a temperature above 1550° C. to be reduced to molten metallic iron and to give the gaseous titanium halide which is passed to a first reactor. Only makeup halogen is required.

U.S. Pat. No. 3,925,057 to Fukushima et al. teaches a process for recycling chlorine gas in the selective chlorination treatment of iron oxide ores containing titanium for the purpose of obtaining ores enriched with TiO$_2$. Here the chlorine gas introduced into the chlorination reaction is converted to ferric chloride by reaction with the iron oxide. The ferric chloride is reconverted to free chlorine by reaction with oxygen in an oxidation process, and the isolated chlorine returned to the chlorination step.

U.S. Pat. No. 3,977,862 to Glaeser teaches the selective chlorination utilizing ferrous chloride alone or in combinations with other chlorinating members notably chlorine, hydrogen chloride or ferric chloride as part or all of the chlorinating agent. An elevated temperature of 950° to 1400° C. is maintained during the chlorination.

U.S. Pat. No. 3,977,863 to Glaeser discloses essentially the same process as in the U.S. Pat. No. 3,977,862.

U.S. Pat. No. 3,977,864 to Glaeser discloses essentially the same reduction/chlorination process for the treatment of titaniferous materials such as ilmenite.

U.S. Pat. No. 3,989,510 to Othmer describes a process including a reactor operating at a high temperature up to 1950° C. which is charged with a mixture of an iron bearing titaniferous ore, silica, a chloride of an alkaline or alkaline earth metal and a solid reductant such as coke. TiCl$_4$ is produced.

U.S. Pat. No. 4,014,976 to Adachi et al. teaches the production of TiCl$_4$ by reacting a TiO$_2$ material having a particle size of 150 mesh with chlorine in the presence of a coarse carbonaceous material in a dilute phase fluidization system.

U.S. Pat. No. 4,017,304 to Glaeser teaches essentially the same process discussed in the three previous Glaeser patents.

U.S. Pat. No. 4,046,853 to Robinson teaches the simultaneous chlorination of the iron and titanium values in an iron-containing titaniferous ores such as ilmenite. Here, the ilmenite is converted to ferrous chloride, but the resulting gaseous effluent is difficult to process to recover the titanium tetrachloride. The iron values in the effluent are partially oxidized to Fe$_2$O$_3$ and FeCl$_3$ thereby reducing the partial pressure of the ferrous chloride while maintaining the presence of some ferrous chloride to scavenge any chlorine emitted from the chlorination stage. The residual gaseous iron chlorides are condensed and chlorine free titanium tetrachloride may be recovered from the remaining gases.

U.S. Pat. No. 4,055,621 to Okudaira teaches a process for obtaining chlorine from iron chloride from chlorination of titaniferous ore by adding iron oxide to iron chloride in an amount above 10% by weight of the resulting mixture, charging the mixture into a fluidizing roasting furnace for oxidation, any overflow being oxidized in a second reactor. The iron oxide thus obtained is recycled to the primary reactor for controlling the reaction temperature in the furnace.

U.S. Pat. No. 4,140,746 to Turner et al. relates to the recovery of chlorine values from iron chloride produced from the chlorination of titaniferous material containing iron and particularly from the carbo-chlorination of ilmenite which, for example, can be the first stage in the so-called chloride route to form titanium dioxide pigment. The iron chloride which may be ferric chloride or ferrous chloride is subjected to a combination of reduction and oxidation reactions. In the reduction reaction, ferric chloride is dechlorinated to ferrous chloride by a reducing agent suitable for producing a chloride compound for recycle to the chlorination process. In the oxidation reaction ferrous chloride is oxidized to ferric oxide and ferric chloride, ferric chloride being recycled to the reduction reaction. By this method the chlorine values are recovered from the by-product iron chloride by a route which avoids the difficult reaction between ferric chloride and oxygen to produce chlorine and ferric oxide.

U.S. Pat. No. 4,174,381 to Reeves et al. teaches an improved process and an apparatus for producing chlorine and iron oxide in a multistage recirculating fluidized bed reactor wherein ferric chloride in the vapor phase is reacted with an excess of oxygen at temperatures of from 550° to 800° C. The improvement comprises utilizing a reactor that includes an initial "dense" zone and a downstream "dilute" zone. In the dense zone, a fuel is burned, reactants and recirculated iron oxide particles are heated, ferric chloride is vaporized and at least 50% of the ferric chloride is converted to chlorine and iron oxide. In the downstream dilute zone, the conversion of ferric chloride is continued to greater than 95% completion.

U.S. Pat. No. 4,183,899 to Bonsack teaches a process whereby an iron-containing titaniferous material is chlorinated with chlorine and ferrous chloride (FeCl$_2$) for producing a product stream of titanium chlorides, and by-product metallic iron and ferrous chloride. The iron chloride is separated from the product stream and recycled to the reaction zone. Iron bearing titaniferous ore and carbon pass dilute phase reactor as finely ground mixture in a laminar flow process.

U.S. Pat. No. 4,310,495 to Bonsack teaches a low temperature (less than 800° C.) process for chlorinating titaniferous material in a fluidized bed. A porous carbon reductant having micropores with a pore diameter of less than 20 angstroms is utilized together with conventional titaniferous material and conventional chlorine sources to achieve reaction at the present low temperatures.

U.S. Pat. No. 4,343,775 to Bonsack teaches a flow process for the chlorination of titaniferous materials. This process utilizes a special microporous carbon (anthracite) characterized by having pores with a pore diameter of less than 20 angstroms. Improved reaction rates and completeness of reaction are achieved.

U.S. Pat. No. 4,442,076 to Bonsack dated Apr. 10, 1984 discloses a process for the entrained downflow nonselective chlorination of fine iron-containing titaniferous material with chlorine gas and/or organochlorides in the presence of fine porous coal based reductant powder for obtaining product chlorides of titanium and iron wherein the combined powders are entrained in and flow downwardly through a chlorination zone at a temperature of at least about 800° C. In the present process similar conditions are used except that the chlorinating agent is $FeCl_3$ instead of chlorine gas or an organochloride. (See also U.S. Pat. No. 4,343,775 to Bonsack, supra.).

As can be seen from the prior art, in various methods for chlorinating rutile, ilmenite titaniferous slags and the like to produce $TiCl_4$, the above titaniferous materials are used as a single raw material charge and chlorine is generally the chlorinating agent.

In cases (Bonsack U.S. Pat. No. 4,183,899; Glaeser U.S. Pat. No. 3,977,864), where $FeCl_2$ is used as a chlorination agent in one zone reactor, the thermodynamics are unfavorable and the reaction is far from complete: CO, $CO_2$, $TiCl_4$, which are formed on the initial step of the overall reaction, along with residues of chlorine inhibit the reaction.

In the present case, the charge of process ore is divided into two portions, which are treated in different unit operations and are chlorinated with different chlorinating agents in each operation. The first larger portion (70–80%) of the charge is chlorinated with chlorine or a mixture of $Cl_2 + FeCl_3$ in a conventional fluidized bed operation to yield $TiCl_4$ and $FeCl_2$.

The second portion (20–30% of the charge) is chlorinated with $FeCl_2$, recovered from the first operation, in a dilute phase operation.

BRIEF STATEMENT OF THE INVENTION

Briefly stated, the present invention is an integrated process for producing titanium tetrachloride ($TiCl_4$) by dividing the process charge of an iron-containing titaniferous ore into two portions; by chlorinating the first, major (70–80% of the ore charge) portion in a first chlorination zone with a chlorinating agent and a carbon reductant under nonselective chlorination conditions to yield $TiCl_4$, iron chloride and carbon oxides; separating the iron chloride from the $TiCl_4$ and carbon oxides; nonselectively chlorinating a second portion of said iron-containing titaniferous material in a second isolated chlorination zone with ferrous chloride chlorinating agent and a carbon reductant to produce a second stream containing $TiCl_4$, ferrous chloride and carbon oxides; attacking the products of the second zone with a part of the calculated amount of chlorine to convert $FeCl_2$ into $FeCl_3$; separating ferric chloride from the $TiCl_4$ and carbon oxides; recirculating said ferric chloride to supplement chlorine in the first chlorination zone.

In a more specific embodiment of the invention, chlorination in the first chlorination zone is carried out under known fluidized bed chlorination conditions with a mixture of $FeCl_3$ and chlorine at about 900° to 1150° C., preferably 1100° C. and chlorination in the second chlorination zone is carried out under entrained flow chlorination conditions with $FeCl_2$ at about 1000° C. to 1400° C. preferably 1300° C. For fluidized bed chlorination, the particle size of the ore can be relatively coarse, i.e., −20 +140 mesh (U.S. Standard Screen Size). Under entrained flow conditions in the second isolated reactor, the particle size of the ore is desirably fine, i.e., −325 mesh or about 10 to 40 microns.

BRIEF DESCRIPTION OF THE DRAWING

The invention will be better understood by having reference to the annexed drawing illustrating the present invention and wherein:

There is shown a schematic and diagrammatic illustration of apparatus for carrying out a preferred embodiment of the present invention and specifying quantities, temperatures, and products obtained.

Throughout this specification and claims the term "product" $TiCl_4$ will be understood as that $TiCl_4$ produced in the process under consideration to distinguish it from $TiCl_4$ spray used to quench various gas streams, which quenching $TiCl_4$ may itself have been previously produced in or according to the present process.

DETAILED DESCRIPTION OF THE INVENTION

The present invention is an improvement on processes for the production of $TiCl_4$ from an iron-containing titaniferous ore, e.g., ilmenite or rutile. It combines in a single integrated process (a) a conventional chlorination operation, utilizing known apparatus for chlorinating with chlorine or a chlorine yielding agent a portion of the ore being processed, and (b) a second chlorinator, preferably a dilute phase chlorinator, for chlorinating with $FeCl_2$ the balance of the ore being treated. The particle sizes of the ore in the respective chlorinators are different. This process overcomes the necessity for getting rid of unwanted $FeCl_2$. Loss of chlorine through loss of $FeCl_2$ is minimized. A by-product of the chlorinating is a metallic iron which poses little or no disposal problem whereas disposal of $FeCl_2$ does. A reduced amount of grinding is involved.

Basically, the reactions encountered in the present process are as follows:

I.
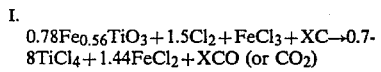
$0.78Fe_{0.56}TiO_3 + 1.5Cl_2 + FeCl_3 + XC \rightarrow 0.78TiCl_4 + 1.44FeCl_2 + XCO$ (or $CO_2$)

II.
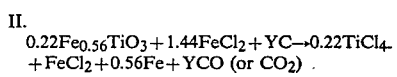
$0.22Fe_{0.56}TiO_3 + 1.44FeCl_2 + YC \rightarrow 0.22TiCl_4 + FeCl_2 + 0.56Fe + YCO$ (or $CO_2$)

III. 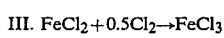 $FeCl_2 + 0.5Cl_2 \rightarrow FeCl_3$

Referring more particularly to the drawing there is here shown in diagrammatic and schematic form a process flow sheet for the preferred mode of carrying out this invention. The numerical values associated with the compounds are in moles. The indicia (g) and (s) signify gas or solid phase respectively. Australian ilmenite ore is the iron-containing titaniferous ore used in the illustrated process. It has an analysis corresponding to the empirical formula $Fe_{0.56}TiO_3$. This Australian ore, which is obtained as a sand size material ($-40 +140$ mesh as mined) is divided into two parts. A 0.78 mole portion is introduced into a conventional fluidized bed reactor 1 from the side along with similarly sized petroleum coke. Chlorine is introduced at the bottom of the reactor while a recycled $FeCl_3$ (solid) is injected directly into the fluidized bed.

Reaction occurs at 950°–1150° C., preferably 1100° C., and results in the formation of $FeCl_2$, $TiCl_4$, CO and $CO_2$.

Ferrous chloride ($FeCl_2$) is separated from a stream by condensation in a suitable precipitator 6 and is fed to the second stage reactor 2 after passing through a vaporizer 3-4, along with the ilmenite and coke from the reducer 5. Finely ground ilmenite, (0.22 mole) and finely divided carbonaceous material, e.g., coke, enters a reducer 5 where the ore and carbon are preheated to 1150° C., thence to a separator to remove carbon monoxide formed in the reducer 5. Stoichiometry calls for 0.22 mole of the ore to be introduced in reactor 2; but in actual practice an excess amounting to up to 30%, or 0.7 mole, may be used. In a specific example a 15% excess was used, e.g., 0.25 mole. The solid particulates enter the dilute phase downflow reactor 2.

According to the second reaction, $FeCl_2$, which is present in excess, reacts with the $TiO_2$ in the ilmenite at a temperature of from 1100°–1450° C., preferably 1300° C., to form $TiCl_4$ and free iron. Iron is readily removed from the system in a cyclone separator 7. Gaseous $FeCl_2$ reacts with a calculated equivalent amount of chlorine to yield ferric chloride. This is introduced along with a spray of $TiCl_4$ into a cyclone separator 8 where the ferric chloride is precipitated as a solid and is recycled to the fluidized bed reactor 1 to be used as a chlorinating agent in the mixture with chlorine gas. $TiCl_4$ after condensation and separation from carbon monoxide in cyclone-separator 8-$a$ enters the collector 10 from whence it is sent to a purification step, not shown. The gaseous carbon monoxide is mixed with oxygen or air in a sand heater to a temperature of 1450° C. to convert the carbon monoxide to carbon dioxide from whence it is exhausted to the air. The heat from the reactor 4 is exchanged with the contents of the vaporizer 3 whereby $FeCl_2$ is converted to a gas for readmission to the dilute phase reactor 2.

The $TiCl_4$ from reactor 1, is as indicated above, put through a precipitator 6 where $TiCl_4$, carbon monoxide and carbon dioxide are separated from the ferrous chloride. This effluent is introduced into a cyclone separator 9 along with additional spray where the $TiCl_4$ is condensed and separated from the carbon monoxide and carbon dioxide which is then flared off. The $TiCl_4$ enters the collector 10 from whence it goes through purification.

The amount of carbon used in each of the two stages is preferably a slight excess over stoichiometric as appears from equations I and II above, X being a stoichiometric minimum of 1.17 and a maximum of 2.34 according to equation I and Y is a minimum of 0.33 and a maximum of 0.66 according to equation II. In general, it is desired to produce a mixture of carbon monoxide and carbon dioxide, and preferably a mixture of carbon oxides which will burn with added air so that the carbon monoxide can be flared to carbon dioxide. In practice, the amount of carbon is adjusted to yield the desired mixture of a carbon oxides.

As indicated above, the condition of the ilmenite entering reactor 1 is such that its particle size may be in the range from $-20$ mesh to $+140$ mesh. The much smaller amount of ilmenite used in the dilute phase reactor is ground to a fineness of from 10 to 40 microns for its reaction. In the first stage, the particle size of the carbon is generally from $-6$ to 40 mesh. In the second stage, the particle size is generally about the same as that of the ilmenite charge.

Thus, by combining the advantages of the conventional chlorinator with the conventional dilute phase reactor, it is possible to obtain the advantages of both without problems sufficient to present an economic inhibitor to using the process. As indicated, the amount of grinding required by the two stage process is very much less than would be required by the dilute phase process if practiced alone. The use of the standard chlorinator for a portion of the titaniferous ore enables the use of chlorine and ferric chloride that may be recovered from the second phase as indicated in the process outlined above. The only by-products are carbon monoxide, carbon dioxide and solid iron. None of these presents a disposal problem.

Under the circumstances, therefore, there has been provided a two stage chlorination process for producing $TiCl_4$, a precursor to pure titanium dioxide of pigmentary grade, utilizing a conventional chlorinator for a portion of the charge, and a dilute phase reactor for the balance of the charge.

What is claimed is:

1. A process for chlorinating an iron-containing titaniferous ore to produce $TiCl_4$ which comprises:
    (a) chlorinating from 70 to 80% by weight of said ore in a first chlorination zone with a carbonaceous reductant and with chlorine alone or in combination with $FeCl_3$ to yield a primary stream containing $TiCl_4$, $FeCl_2$ and oxides of carbon,
    (b) separating $FeCl_2$ from said primary stream;
    (c) chlorinating the balance of said ore in a second chlorination zone using said $FeCl_2$ as a chlorinating agent and a carbonaceous reductant under dilute phase conditions to yield a secondary stream containing $TiCl_4$, metallic iron, unused $FeCl_2$ and oxides of carbon;
    (d) separating the metallic iron and $FeCl_2$ from said secondary stream; and,
    (e) combining the product $TiCl_4$ from said primary and secondary streams.

2. The process as described in claim 1 wherein the $FeCl_2$ from the secondary stream is chlorinated to $FeCl_3$ and said $FeCl_3$ is recycled to the first chlorination zone.

3. The process as described in claim 1 wherein the first chlorination zone is a fluidized bed chlorination zone.

4. A process as defined in claim 1 wherein iron chloride is isolated from the primary and secondary gaseous $TiCl_4$-containing product streams by quenching the streams with liquid $TiCl_4$, respectively, to a temperature sufficient to precipitate the iron chloride.

* * * * *